United States Patent [19]

Mick et al.

[11] Patent Number: 4,782,461

[45] Date of Patent: Nov. 1, 1988

[54] LOGICAL GROUPING OF FACILITIES WITHIN A COMPUTER DEVELOPMENT SYSTEM

[75] Inventors: John R. Mick, Los Altos Hills; Darrell L. Wilburn, Saratoga; Michael J. Miller, San Jose, all of Calif.

[73] Assignee: Step Engineering, Sunnyvale, Calif.

[21] Appl. No.: 623,160

[22] Filed: Jun. 21, 1984

[51] Int. Cl.[4] .............................................. G06F 9/00
[52] U.S. Cl. .................................................. 364/900
[58] Field of Search ... 364/200 MS File, 900 MS File

[56] References Cited

U.S. PATENT DOCUMENTS

| | | | |
|---|---|---|---|
| 4,370,728 | 1/1983 | Leffron | 364/900 |
| 4,525,802 | 1/1985 | Hackamack | 364/900 |
| 4,633,417 | 12/1986 | Wilburn et al. | 324/73 R |

OTHER PUBLICATIONS

Department of Electrical & Computer Engineering, UW–Madison CDSL Verscon V 1/82 DLD pp. 1–18.
IBMTDB, vol. 20, No. 6, Nov. 1977, pp. 2247–2248, G. Salyer.
IBMTDB vol. 21, No. 7, Dec. 1978, pp. 3004–3005, M. D. Canon.
Department of Electrical & Computer Engineering, VW–Madison, COLS, version V 1/82DLD, pp. 1–18.

*Primary Examiner*—Gareth D. Shaw
*Assistant Examiner*—John G. Mills
*Attorney, Agent, or Firm*—Thomas E. Schatzel

[57] ABSTRACT

A logical grouping of facilities within a computer development system where said facilities include breakpoint control, trace control and memory, a plurality of VLSI emulators, a plurality of storage device emulators, a plurality of emulators for simulating program or microprogram storage, and may be selectively assigned to said grouping by a user. Said selectively assigned facilities are associated with a clock control and are used for the design, debugging and testing of computer systems.

10 Claims, 4 Drawing Sheets

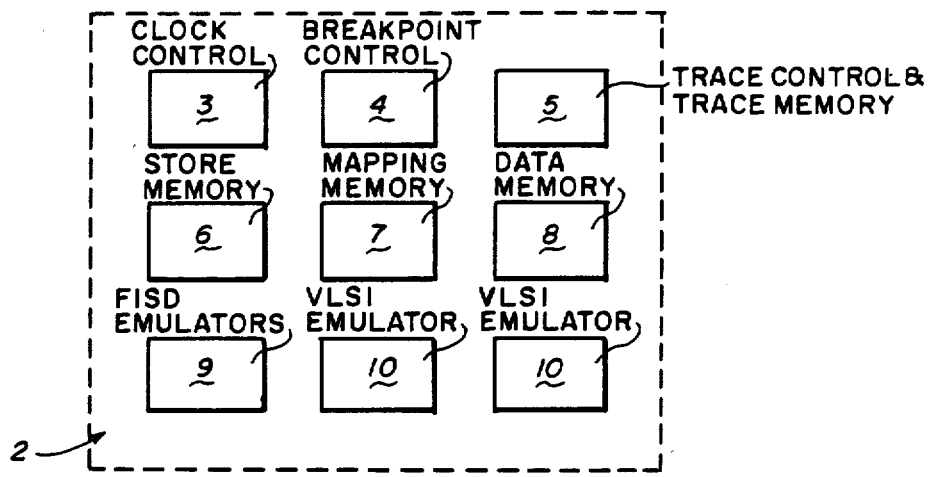
Fig_1
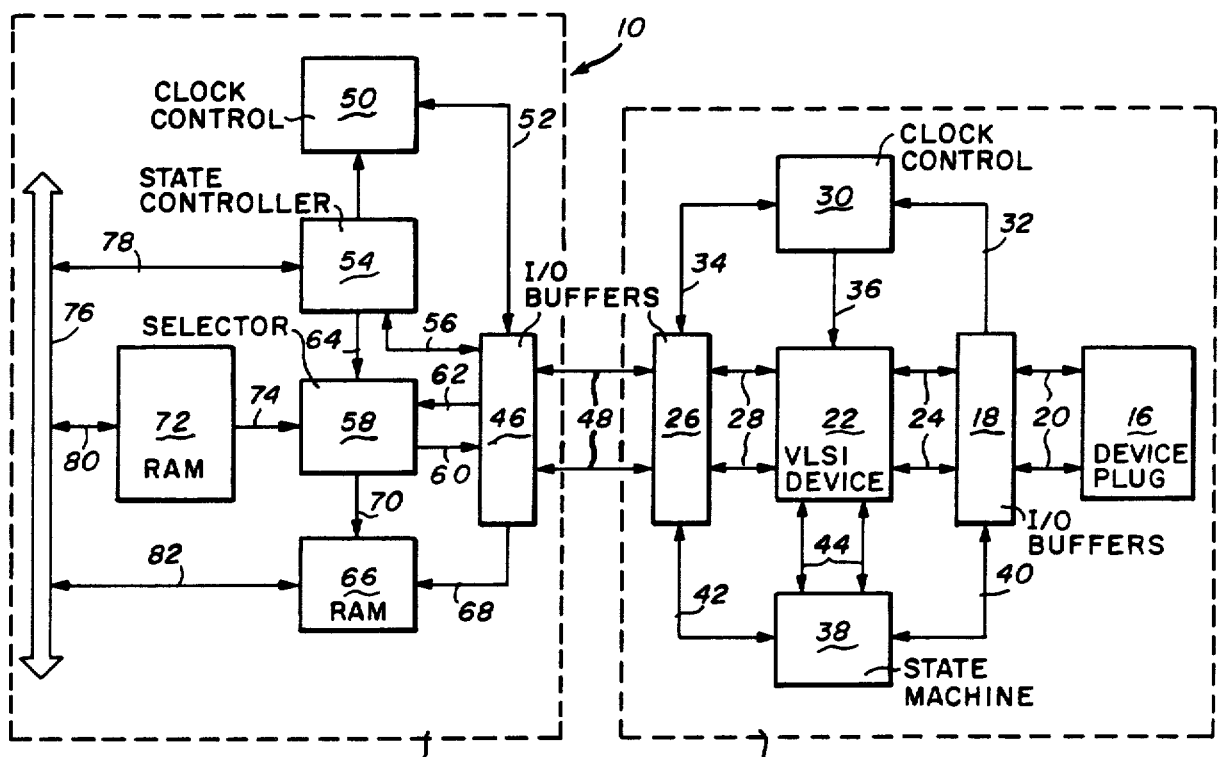
Fig_2

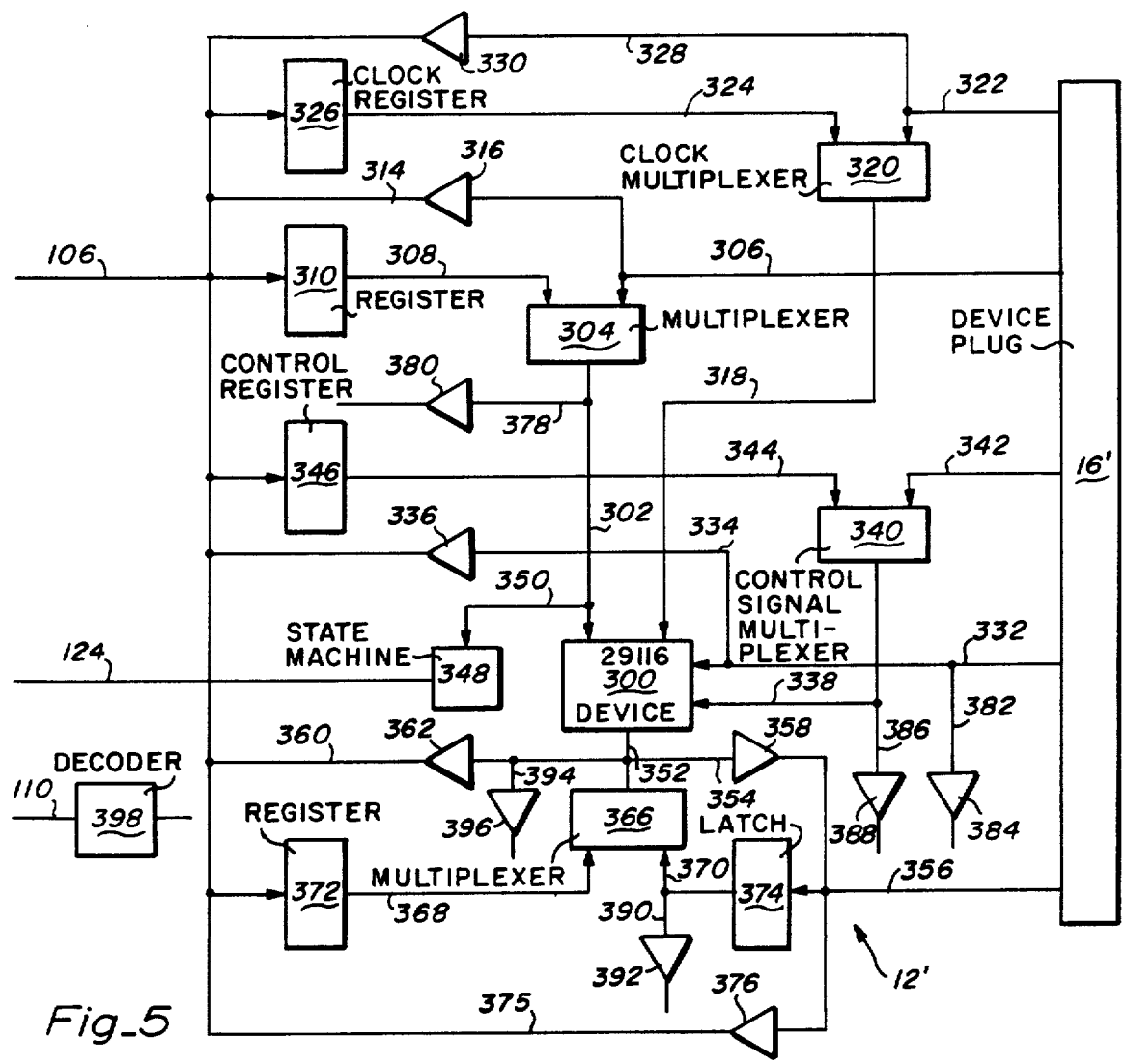
Fig_5
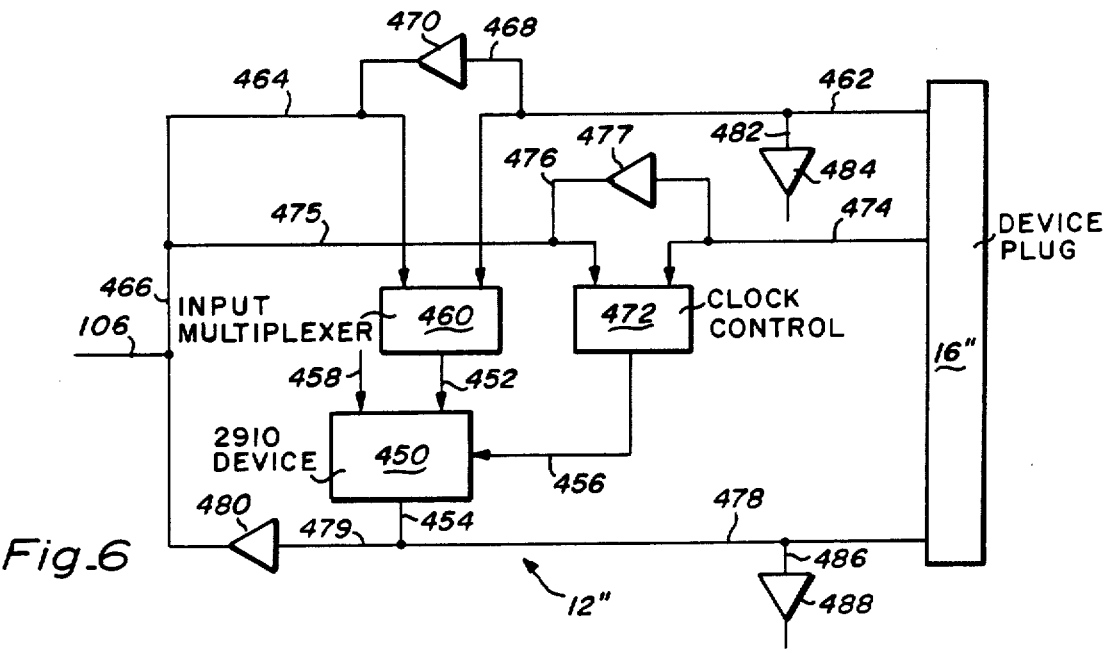
Fig_6

LOGICAL GROUPING OF FACILITIES WITHIN A COMPUTER DEVELOPMENT SYSTEM

BACKGROUND OF THE INVENTION

1. Field of the Invention

The invention relates generally to computer development systems and more particularly to a logical grouping of facilities within a development system for high speed digital systems which may contain computer subsystems employing microprogrammable VLSI devices, fixed instruction set devices or other state machines and program memory.

2. Description of the Prior Art

Development systems are used by computer design engineers to design, test and debug computer systems and subsystems. Development support has become more complex with the increased use of microprogrammable VLSI function chips that contain ever increasing performance and functional density. In the past, bit slice sequencers and arithmetic logic units (ALU) represented the microprogrammed parts with which the designer had to contend. Recently, many new functional microprogrammed VLSI circuits have appeared. Typically, such parts are used in systems comprising a microprocessor, special function VLSI chips with microprogrammability, microprogrammed subsystems and various program stores. Currently, there is no way to observe the state of various internal VLSI processes and control during debug and test. Logic analyzers are used to monitor the input and output of a VLSI device, a process by which the internal state can only be indirectly inferred. Furthermore, such results are often erroneous requiring a trial and error approach to determining state. It is desirable to have the ability to halt the execution of the entire system or parts of the system under test and examine the internal and external state of the entire system or subsystem and the path of execution. However, attempts to accomplish that have not been practical and none have been embodied in a single machine.

SUMMARY OF THE PRESENT INVENTION

It is therefore an object of the present invention to provide a development system which can examine the internal state of VLSI devices.

It is a further object to provide a development system which can stop the execution of the entire system under test.

It is a further object to provide a development system which can stop execution of a subsystem of the system under test.

It is a further object to provide a development system which includes in-circuit emulation for fixed instruction set devices and VLSI devices, microprogram storage, main program memory, all in a single instrument resulting in the maximum reusability of expensive hardware from project to project.

It is a further object to provide a development system which maximizes the flexibility of instrumentation from one project to the next through software controlled assignment of instrumentation facilities in a single instrument.

It is a further object to provide a development system wherein one instrument main frame, data from systems and/or subsystems can be collected and displayed in a single stateword display.

Briefly, a preferred embodiment of the present invention includes a means for controlling a clock signal in combination with one or more of the following facilities; a means for controlling break points, a means for storing data, a means for storing programs to be executed by various target execution sites including microprogram or main memory program for fixed instruction set devices, a means for controlling trace and a means for emulating VLSI devices, a means for in-circuit emulation of microprocessors, the combination being provided with a means for connecting the various facilities to a target machine. The combination of the various facilities with the clock control is defined by the user using a computer program which assigns the desired facilities to various execution sites. Logically it is called a meta-machine instrument. A single system may contain multiple meta-machine instruments which may function as a test and measurement device simultaneously.

An advantage of the development system of the present invention is that the internal state of VLSI devices can be examined.

Another advantage is that the development system can stop the execution of the entire system under test.

Another advantage is that the development system can stop the execution of a subsystem of the system under test.

Another advantage is that the development system maximizes the reusability of hardware from project to project.

Another advantage is that the development system maximizes the flexibility of instrumentation by use of software assignment of instrumentation facilities in a single instrument.

A further advantage is that the development system can collect and display data from systems and/or subsystems in a single stateword display.

IN THE DRAWING

FIG. 1 is a block diagram of a logical grouping of facilities within a development system in accordance with the present invention;

FIG. 2 is a block diagram of a VLSI device emulator;

FIG. 5 is a block diagram of an emulator head for a 29116 VLSI device;

FIG. 6 is a block diagram of an emulator head for 2910 VLSI device;

DETAILED DESCRIPTION OF THE PREFERRED EMBODIMENT

Figure 3:
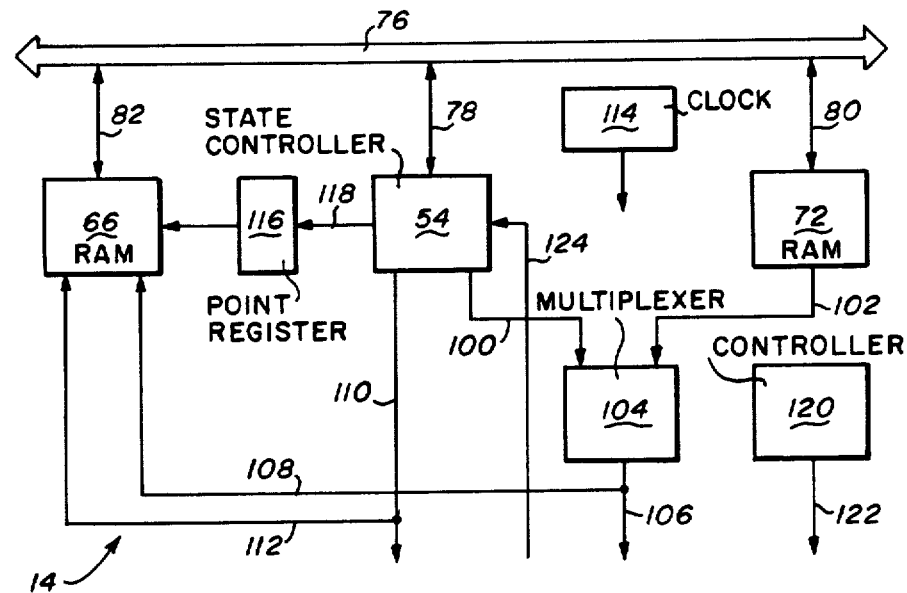
FIG. 3 is a block diagram of an emulator controller.

In FIG. 1 there is illustrated a development system referred to by the general reference numeral 2 incorporating the present invention. Development system 2 has a plurality of facilities including a clock control 3, a breakpoint control 4, a trace control and trace memory 5, a writable control store (WCS) memory 6, a mapping memory 7, a data memory 8, a plurality fixed instruction set device emulators 9, and a plurality of VLSI emulators 10. These facilities 2, 3, 4, 5, 6, 7, 8, 9 and 10 may be individually connected to a target machine (computer) which is being tested. The interconnects (not shown)

used for such connection are of those types currently used in the art. The various memory devices 6, 7 and 8 will support the simulation of both microprogrammed memory and main program memory.

The emulators 9 may be for 68,000, type microprocessors or other fixed instruction set devices. The emulators 10 may be for specific VLSI devices such as 29116 and 2910 devices manufactured by Advanced Micro Devices or their equivalents as described below. The VLSI emulator 10 is the subject of a separate application filed concurrently herewith.

In FIG. 2, there is illustrated non-fixed instruction set VLSI device emulator 10. The emulator 10 includes an emulator head 12 and an emulator controller 14. The emulator head 12 includes a device plug 16 connected to a plurality of target machine input/output buffers 18, by a plurality of device plug signal paths 20.

The device plug 16 typically has a plurality of pins which correspond to the pin arrangement of the VLSI device to be emulated so that it can replace such VLSI device within a target machine.

The signal paths 20 may be in the form of a multilead cable of minimum length to maximize the speed at which emulator 10 can operate. The input/output buffers 18 are connected to a VLSI device 22 by a plurality of target machine input/output signal paths 24. The VLSI device 22 is a non-fixed instruction set device. The VLSI device 22 may be a microprocessor or a separate function that may be used as a subsystem in an overall system. The VLSI device 22 may be gate-arrays or custom circuits also. In particular, the 29116 and 2910 devices manufactured by Advanced Micro Devices may be emulated using the present invention.

VLSI device 22 is connected to a plurality of emulator controller input/output buffers 26 by a plurality of emulator controller input/output signal paths 28. A clock control 30 is connected to input/output buffers 18 by a target machine clock signal path 32. Clock control 30 is also connected to input/output buffers 26 by an emulator controller clock signal path 34. VLSI device 22 is connected to clock control 30 by a clock control output signal 36.

A customized state machine 38 is connected to input/output buffers 18 by target/state machine's signal path 40. State machine 38 is also connected to input/output buffers 26 by an emulator controller/state machine signal path 42. VLSI device 22 is connected to state machine 38 by a plurality of state machine/VLSI device signal paths 44.

The emulator controller 14 has a plurality of emulator head input/output buffers 46 which are connected to emulator controller input/output buffers 26 by a plurality of control-head signal paths 48. Signal paths 48 may be in the form of a multi-lead cable of a length which permits emulator head 12 to be remotely located from emulator controller 14. A second clock control 50 is connected to input/output buffers 46 by a controller clock signal path 52.

A microprogrammed state controller 54 is connected to emulator head input/output buffers 46 by a signal path 56.

A selector 58 is connected to input/output buffers 46 by a selector output signal path 60 and a selector input signal path 62. Selector 58 is also connected to microprogrammed state controller 54 by a state controller output signal path 64. A current state random access memory (RAM) 66 is connected to input/output buffers 46 by a current state RAM input signal path 68. Selector 58 is additionally connected to current state RAM 66 by pointer signal path 70.

A new operand RAM 72 is connected to selector 58 by operand RAM output signal path 74. A host processor bus 76 is connected to microprogrammed state controller 54, new operand RAM 72 and current state RAM 66 by a first, a second, and a third bus connection signal path 78, 80, and 82, respectively. An Intel Multibus and a Motorola 68000 microprocessor or their equivalents may be used as the host processor bus with the emulator 10 of the present invention.

A more detailed diagram of the emulator controller 14 is shown in FIG. 3. A state controller data output line 100 and an operand RAM data output line 102 are multiplexed by a multiplexer 104 which is controlled by microprogrammed state controller 54. The output of multiplexer 104 is a data bus 106 which is connected through input/output buffers 46 and 26 to a similar bus in emulator head 12. Coming off data bus 106 is a first current state RAM data input line 108. Typically, data input line 108 carries 16 bits in parallel. Microprogrammed state controller 54 is connected to a combination address/data bus 110 which communicates with a similar bus in emulator head 12. A second current state RAM data input line 112 of similar composition as data input line 108 comes off address/data bus 110. The emulator controller 14 has a clock 114 which provides the appropriate clock signals for the operation of the emulator controller 14. A pointer register 116 is associated with current state RAM 66 and is controlled by microprogrammed state controller 54 over pointer control line 118. A variable microcycle clock-type controller 120 controls write, read, no-operation, and write/read functions in emulator head 12 over clock control line 122 which is in communication with the emulator head 12. A test input line 124 may be used as an input to state controller 54 to provide a signal from emulator head 12 as to whether or not instructions from controller 54 are capable of being executed by VLSI device 22 at a given time.

Figure 4:
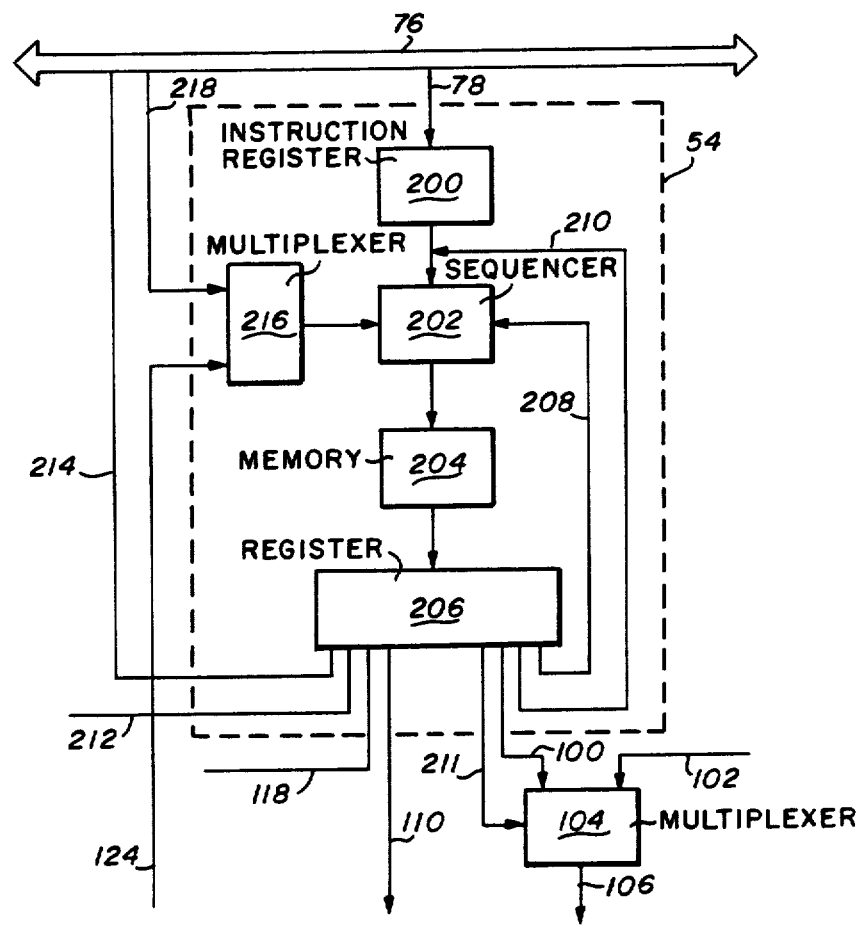
FIG. 4 is a block diagram of a microprogrammed state machine used in the emulator controller of FIG. 3.

FIG. 4 illustrates the structure of microprogrammed state controller 54. Microprogrammed state controller 54 includes an instruction register 200, the output of which is provided to a 2910 sequencer 202. The sequencer 202 provides the address in a microprogrammed memry 204 of the next microinstruction to be executed. The microprogrammed memory 204 provides the next instruction to be executed to a pipeline register 206. The output of pipeline register 206 includes a next address control line 208, a jump address control line 210, state controller data output line 100, a multiplexer control line 211, combination address/data bus 110, pointer control line 118, a clock control line 212 and a completion of instruction line 214. Microprogram state controller 54 also includes a multiplexer 216, the input of which are test signal line 124 and a start instruction execution line 218.

The emulator controller 14 is a generalized controller in that it is not limited to a specific VLSI device. When the type of VLSI device is changed, no hardware changes are necessary in emulator controller 14. In order to adapt the emulator controller 14 for a new VLSI device, only the contents of microprogram memory 204 need to be altered to accomodate the new VLSI device. Also due to the generalized nature of the emulator controller 14, it is possible to run more than one emulator head 12. Since the data/address structure between controller 14 and head 12 is not device specific, a plurality of heads may be controlled by a single controller 14. Even heads for different VLSI devices may be controlled by a single controller. This is accomplished by using an appropriate program in the microprogram memory 204.

The host processor bus 76 can communicate with current state RAM 66, microprogrammed state controller 54 and the new operand RAM 72 in response to the users needs. For example, if it was desired to modify the state of a register in the emulator head 12, a command would go to the microprogrammed state controller 54 where it is directed to the appropriate instruction in the microprogram memory 204. A new value to be loaded in the register is placed in the new operand RAM 72. Then the microprogram state controller 54 will send the contents of the new operand RAM 72 to the appropriate register in the emulator head. Similarly, when it is desired to read the contents of a register or other memory, the microprogram state controller 54 sends an appropriate instruction to the emulator head 12 and the data requested is placed in the current state RAM 66.

FIG. 5 illustrates an emulator head 12' which is designed for an AMD 29116 device. Emulator 12' includes a 29116 device 300 with an input bus 302 which is the output of an input bus multiplexer 304. There are two sources of input to multiplexer 304, a target machine input bus 306 and an emulator controller bus 308. The input buses 302, 306 and 308 are typically comprised of sixteen wires. Target machine input bus 306 is connected to device plug 16'. Emulator controller input bus 308 is the output of an input bus register 310. Input bus register 310 ties into an emulator head data bus 312 which is connected to data bus 106. Data on the target machine input bus 306 may be routed to emulator head data bus 312 over a signal path 314 through a buffer 316.

A clock input path 318 is an input to the 29116 device 300. Clock input path 318 is the output of a clock multiplexer 320 which has two inputs, a target machine clock signal path 322 connected to device plug 16' and an emulator controller clock signal path 324. Emulator controller clock signal path 324 is the output of a clock register 326 which connects to emulator head data bus 312. A clock signal path 328 connects to emulator head data bus 312 through a clock buffer 330.

A first control signal path 332 connects between 29116 device 300 and device plug 16'. A signal path 334 connects first control signal path 332 to emulator head data bus 312 to a control signal buffer 336. A second control signal path 338 is the output of a control signal multiplexer 340 which has two inputs, a target machine control signal path 342 and an emulator controller control signal path 344. Emulator controller control signal path 344 is the output of a control register 346 which connects to the emulator head data bus 312.

A state machine 348 receives an input through a state machine input path 350 and produces a signal which is transmitted to the emulator controller 14 on test input line 124 (see FIGS. 3 and 4).

A bi-directional Y bus 352 is an input/output source to the 29116 device 300. A first Y bus output path 354 connects with a bi-directional target machine Y bus 356 through a buffer 358. A second Y bus output path 360 connects to emulator head data bus 312 through a buffer 362. An input to Y bus 352 is an output 364 of a multiplexer 366 which has two inputs, an emulator controller Y bus 368 and a latch output line 370. Emulator controller Y bus 368 is the output of a Y bus register 372 which connects to emulator head data bus 312. Latch output line 370 is the output of a latch 374 which connects to target machine Y bus 356. Also coming off target machine Y bus 356 is a signal path 375 to emulator head data bus 312 through a buffer 376.

In order to provide connection to a trace capability, various signal paths are provided. These include an input bus trace connection 378 through an input bus trace buffer 380, a first control signal trace connection 382 through a first control signal trace buffer 384, a second control trace connection 386 through a second control signal trace buffer 388, a Y bus input trace connection 390 through a Y bus input trace buffer 392 and a Y bus output trace connection 394 through a Y bus output trace buffer 396.

The combination address/data bus 110 from emulator controller 14 is in communication with emulator head 12' where addresses are decoded by a decoder 398 and appropriately routed and data lines established with the various registers.

The input bus 302 to 29116 device 300 comes through the input bus multiplexer 304. The multiplexer 304 receives input signals produced by the target machine on target machine input bus 306 or inputs produced by the emulator controller 14 over emulator controller input bus 308. Inputs from emulator controller 14 can be temporarily stored in input bus register 310 until instructed to be directed to 29116 device 300 through multiplexer 304. The multiplexer 304 is controlled by the emulator controller 14 and selects either inputs from the emulator controller 14 or the target machine as desired by the user. When it is desired to read the inputs coming directly from the target machine, the signals may be directed through buffer 316 and read onto data bus 106 which is in communication with emulator controller 14.

The Y bus 352 is bi-directional, i.e. it can handle both input and output signals. When the Y bus is used for inputs, those inputs are handled in a manner similar to signals on the input bus 302 as described above. The target machine or the emulator controller 14 may be the source of inputs on the Y bus through a multiplexer 366. If it is desired to read inputs directly from the target machine to the emulator controller 14, a signal path 374 through buffer 376 is provided to allow target machine inputs to be directed to data bus 124. When Y bus 352 is used as an output, data can come out of the 29116 device 300 and proceed to the target machine via first Y bus output path 354 through buffer 358 to target machine Y bus 356. If it is desired to read Y bus 352 outputs back to the emulator controller 14, data is directed on second Y bus output path 360 through buffer 362 to emulator head data bus 312 to data bus 106 which communicates with emulator controller 14.

The 29116 device 300, the design of which is well known in the art, contains an internal Y bus. On that Y bus there is a latch for storing incoming data. In order to properly emulate the 29116 device 300, it is necessary to simulate that internal latch in the form of latch 374 which permits the storage of incoming data on the Y bus to be stored external to the 29116 device 300.

There are two types of control lines associated with the 29116 device 300, inputs and outputs. The control outputs are transmitted to the target machine over first control signal path 332. Such outputs may also be read onto the data bus 106 via signal path 334 through control signal buffer 336 onto emulator head data bus 312. The control inputs are received by the 29116 device 300 on second control signal path 338 which is the output of control signal multiplexer 340. The source of control inputs may either be the target device over target machine control signal path 342 or emulator controller control signal path 334. Control inputs from emulator controller 14 may be temporarily stored in control register 346. Control signal multiplexer 340 is controlled by emulator controller 14 to select the desired source of control input from either the target machine or the emulator controller 14.

The normal source of a clock signal to the 29116 device 300 is from the target machine. However, emulator head 12' is designed such that the clock control signal from the target machine may be multiplexed in clock multiplexer 320 along with a clock control signal from the emulator controller 14 on emulator controller clock signal path 324. The emulator controller 14 can provide, through clock register 326, a signal into the 29116 device 300 to perform the clocking function. The emulator head 12' also has the capability to read the clock signal polarity to emulator controller 14 via clock signal path 328 through clock buffer 330 onto emulator head data bus 312 and to data bus 106. This allows the user to determine if the clock has stopped low or stopped high and take control of the same polarity. For example, if the clock had stopped low, the emulator controller can cause a low-high-low transition to cause a "clock" to occur. Conversely, if the clock is stopped high, a high-low-high transition is used to cause a "clock" to occur.

The state machine 348 in communication with the input bus 302 over state machine input path 350 is customized to operate with the 29116 device 300. Some of the instructions executed by the 29116 device 300 are known as immediate instructions. An immediate instruction is one that involves more than one word. For example, if the emulator controller 14 sent an instruction to load a register from the input bus, the next word following the instruction would be the value to be loaded. A unique situation in microprogramming exists in the 29116 device 300 in that an instruction actually gets captured inside the device. Since the emulator 10 is operating and a stopping of the clock externally can happen at any time, it is necessary to keep track of whether or not the device had just executed the first part of an immediate instruction. It is necessary to determine whether the device is waiting for data to be fed in the input bus as opposed to the next instruction being fed in the input bus. The state machine 348 was custom designed to follow the instruction inputs and keep track of whether or not the device was executing an instruction which required a second word. In this way, the state machine determines whether or not the device is half-way through one of the immediate instructions in which case it is necessary to prevent the emulator controller 14 from sending data to change the contents of the 29116 device 300 until the second word of the immediate instruction has been executed. This is done by a signal over test input line 124 to microprogram state controller 54 and emulator controller 14. (See FIGS. 2 and 3). The use of state machine 348 allows the emulator 10 to keep track of instructions on the input bus 302 in a similar manner as is done internally in the 29116 device 300 so that it can be determined when the internal input bus needs to be used for data associated with an immediate instruction.

FIG. 6 illustrates an emulator head 12" which is designed for an AMD 2910 device. Emulator head 12" includes a 2910 device 450 with an input bus 452, an output bus 454, a signal input path 456 and a control signal input path 458. Input bus 452 is the output of an input multiplexer 460 which has two input sources, a target machine input bus 462 and an emulator controller input bus 464. Target machine input bus 462 receives signals from the target machine through a device plug 16". Emulator controller input bus 464 receives signals from the emulator controller 14 via data bus 106 and emulator head data bus 466. Input signals from the target machine may be read by the emulator controller 14 via signal path 468, buffer 470, emulator head data bus 466 and data bus 106.

Clock signal input path 456 is the output of a clock control 472 which has two input sources, a target machine clock signal path 474 and an emulator controller clock signal path 475. Target machine clock signals may be read by the emulator controller 14 through a signal path 476 and clock buffer 477. Clock control 472 functions in a manner similar to that described for the clock multiplexer 320 associated with the 29116 device 300.

The output bus 454 transmits output signals to the target machine over a target machine output signal path 478. Output signals may be read by the emulator controller 14 through emulator controller output bus 479 through output buffer 480. Connection to a trace capability is provided by an input trace connection 482 through an input trace buffer 484 and an output trace connection 486 through an output trace buffer 488.

The 2910 device 450, the structure of which is well known in the art, has an internal stack pointer which keeps track of how many words are on an internal stack. However, external to the 2910 device 450, there is no way to know how many words are on the internal stack. The only indication is a full flag which means a user can only determine when the stack is full. It is desirable in in circuit emulation of a 2910 device to determine the status of the internal stack. This problem is solved by the present invention by microprogramming the microprogram state controller 54 in the emulator controller 14 to push words on the stack until the stack is full. The number of words pushed onto the stack is counted, which, when the size of the stack is known, can be used to determine how many words were on the stack initially. Then, the emulator controller 14 pops all of the words off the stack so that it can read those words. When this is complete, the emulator controller 14 pushes words back on the stack such that the stack is restored to its original condition. These operations all occur or are performed between user clock cycles.

Figure 7:
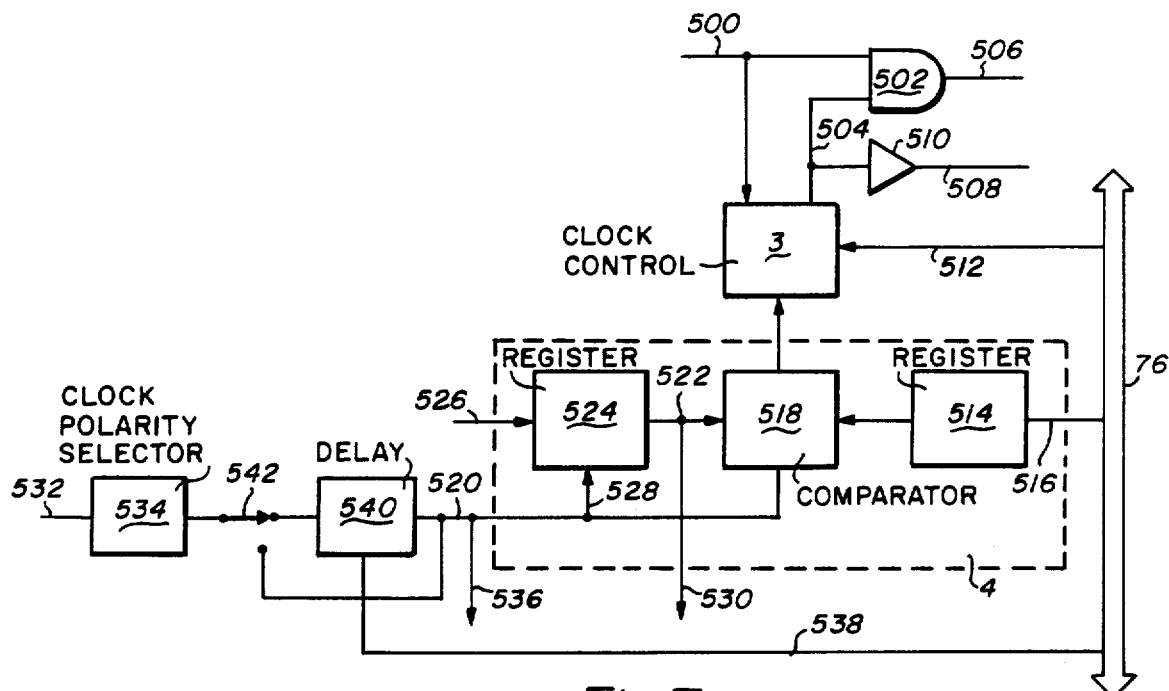
FIG. 7 is a block diagram of a clock control and breakpoint control.

In FIG. 7 there is illustrated clock control 3 and breakpoint control 4. Clock control 3 includes a system clock input path 500 which is an input to clock control 3 and a first input to AND gate 502. A clock control output path 504 is a second input to gate 502. The output of gate 502 is a system clock output path 506. Coming off clock control output path 504 is clock enable signal path 508 through a clock enable buffer 510. A clock control data path 512 exists between clock control 3 and host processor bus 76.

Breakpoint control 4 includes a breakpoint value register 514 which is connected to host processor bus 76 by a breakpoint data path 516. The output of breakpoint value register 514 is fed to a 54 bit comparator 518. Comparator 518 has two other inputs, a sample clock signal path 520 and a sample register output path 522 which is the output of a 54 bit sample register 524. Sample register 524 receives an address data qualifier input path 526. Input path 526 comprises 54 separate paths. Sample register 524 also receives a sample clock signal an a signal path 528 off sample clock signal path 520. A trace connection 530 connects sample register output path 522 to a trace capability. A target machine sample clock 532 may be selected for either polarity by a clock polarity selector 534 and an actual sample clock 536 is used to capture data from the target machine. The target machine sample clock 532 may be programmatically delayed by a value set by host processor bus 76 via a path 538 to a sample clock programmatic delay 540. The user may determine whether the sample clock signal is delayed by selecting the position of a switch 542.

Clock control 3 can start and stop the clock on either a synchronous or asynchronous basis, single step the clock or create multiple clock cycles. Control single stepping or cyclng is by the host processor bus 76 via path 512. These clock functions are accomplished by either gating the user's system clock or providing a clock signal to the target machine. Clock control may be expanded to encompass dynamic clock control for execution sites which do not allow stopping the clock.

In debugging the target machine, it is desirable to stop the machine at a predetermined point. Breakpoint control 4 allows the user to select a "matchpoint" (a desired combination of data and addresses) at which the user wants to halt the target system and load that matchpoint into breakpoint value register 514. As the target machine operates, data addresses and qualifiers are sampled and stored in sample register 524 and compared in comparator 518 with the match word stored in breakpoint value register 514. When a match occurs, a signal from comparator 518 is sent to clock control 3 to stop the target machine. This proces allows the user to examine the current state of the target machine and continue to run or single stop the clock in further debugging.

Figure 8:
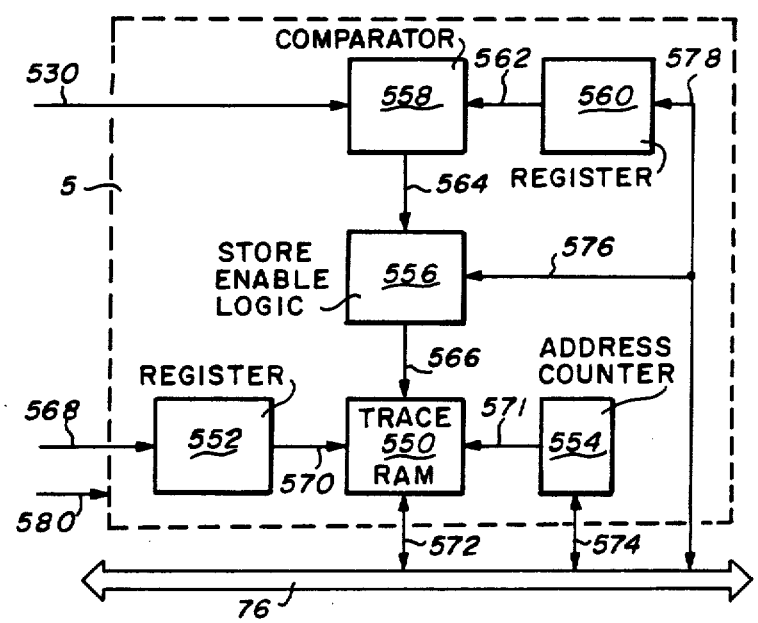
FIG. 8 is a block diagram of a logic state analyzer and trace control.

In FIG. 8 there is illustrated trace control in memory 5 which includes a trace RAM 550, a trace data sample register 552, and address RAM 554, a store enable logic 556, a 54 bit comparator 558, and a store matchword register 560. Comparator 558 has two inputs, the trace connection 530 (see also FIG. 7) and matchword register input path 562. A comparator output path 564 is an input to the store enable logic 556. An enable logic output path 566 is an input to trace RAM 550. Trace data sample register 552 receives input over trace data input path 568. A sample register output path 570 connects trace data sample register 552 and trace RAM 550. An address counter output 570 is the address input into trace RAM 550. The host processor bus 76 is connected to trace RAM 550, address counter 554, store enable logic 556 and store match word register 560 by trace data path 572, trace RAM address path 574, enable logic path 576 and match word register input path 578, respectively.

Trace control and memory means 5 has an actual sample clock 580 which operates to sample data available on trace data input path 568 at a particular time, normally at a clock edge. Actual sample clock 580 may be generated by similar means as described above and illustrated in FIG. 7 for actual sample clock 536. However, data coming in may not be valid at exactly that time due to data skew in instrumentation cables, cable delay or other imperfections in the instrumentation. In order to compensate for setup and hold times as well as the above imperfections the trace sample clock is programmable such that its timing may be optimally positioned with respect to the target machine system clock. The sample time may be programmed with respect to either polarity of a clock edge in two nano-second increments between two nano-seconds and two hundred and fifty six nano-seconds. Thus, the sample window can be moved such that the data sampled will be valid.

It should be noted that the trace capability associated with system 2 may include hardware instrumentation capabilities. For example, it may be expanded for hardware instrumentations for glitch catching and timing analysis. These are logical pieces which may be part of a meta machine instrument.

In a manner similar to that used in breakpoint control 4, the user loads a desired matchword in store match word register 560. The matchword represents a certain combination of data and addresses which when it appears in the target machine, the user wants to store data in trace RAM 550. The user defined matchwords are compared against breakpoint data inputs over trace connection 530 by comparator 558. If a match occurs, data will be stored in trace RAM 550. In practice, two simultaneous matchwords are used so that the trace RAM 550 can either store data always, store on the match of one matchword, store on the AND combination of two matchwords or store on the OR combination of two matchwords.

A host processor, typically a 68000 microprocessor or its equivalent, is programmed such that the user can selectively assign various facilities (breakpoint control 4, trace control 5, memories 6, 7 and 8, fixed instruction set device emulator 9, and VLSI emulators 10) to be combined with clock control 3 to create a collection of facilities which are operated and controlled as one self-contained entity. This entity is a logical grouping of development system resources and is known as an execution site. The development system 2 may be used to stimulate a target machine. Memory can be used as a facility to generate digital stimulus and then trace or other memory can be used to capture and store the target machines response.

The selective assignment of facilities allows the user to determine how he wants to view each site of execution. Further programming permits the logical grouping to have a broad range of capabilities including breakpoint and trigger (associated with placing data in trace memory), run to execute, halt, single step, single cycle, and, for control of execution path, force and jam, and program modification/examination in simulated memory. Also, the VLSI emulators allow examination of internal state, pin status of a particular device, and commands to modify state.

Typically, the user will run to one of the predetermined breakpoints at which time the user can observe system or subsystem state. This is done by displaying data from various probes (e.g. trace probes or program memory) as a single digital stateword. The stateword is disassembled such that the display shows the state of a number of devices within the target machine. In this manner the user may examine the system and subsystem state. It if is desirable to modify the contents of a program or microprograms stored in one of the memory devices 6, 7 or 8 associated with execution site, the user may change the program or microprogram contents by use of the software editing program.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended be interpreted as covering all alterations and modifications as fall within the true spirit and scope of the invention.

We claim:

1. A logical grouping of facilities within a development system, comprising:

a means for controlling clock signals;

a plurality of facilitates including a means for controlling break points to halts the system at a predetermined match point, a plurality of means for emulating or simulating program or microprogram storage, means for detecting a trace match word and storing trace data, and a plurality of functional microprogrammable very large scale integrated circuits (VLSI) emulators and a plurality of fixed instruction set microprocessor emulators;

a microprocessor programmed to selectively assign said plurality of facilitaties for operation in association with said clock control means such that the assigned facilities and clock control means form an execution site for the design, debugging and testing of a microprogrammable target machine;

a plurality of means for connecting said assigned facilities to said target machine; and wherein said VLSI emulator includes a device plug for insertion in said target machine, a plurality of target machine input/output buffers connected to the device plug by a plurality of signal paths, a VLSI device connected to the target machine input/output buffers by a plurality of signal paths, a means for controlling an emulator head clock connected to the target machine input/output buffers by a signal path and to the VLSI device by a signal path, a plurality of emulator controller input/output buffers connected to the means for controlling an emulator head block by a signal path and to the VLSI device by a plurality of signal paths, a state machine connected to the target machine input/output buffers by a signal path, to the VLSI device by a plurality of signal paths and to the emulator controller input/output buffers by a signal path, a plurality of emulator head input/output buffers connected to the emulator controller input/output buffers by a plurality of signal paths, a second means for controlling a clock connected to the emulator head input/output buffers by a signal path, a microprogrammable means for controlling the transmission of instructions and control signals to the VLSI device and the reception of data from the VLSI device and the target machine, the microprogrammable control means being connected to the emulator head input-output buffers by a signal path and to the clock control means by a signal path, a means for storing data corresponding to the current state of the VLSI device, said means for storing data corresponding to the current state of the VLSI device connected to the emulator head input/output buffers by a signal path, a means for storing new operands, a means for selecting the source of signals to be transmitted to the VLSI device, the selector means being connected to the current state data storage means by a signal path, to the microprogammable control means by a signal path, to new operand storage means by a signal path, and to the emulator head input/output buffers by a plurality of signal paths, and a host computer bus connected to the current state data storage means by a signal path, to the new operand storage means by a signal path and to the micro-programamble control means by a signal path.

2. A logical grouping of facilities within a development system, comprising:

a means for controlling clock signals;

a plurality of facilities including a means for controlling break points to halt the system at a predetermined match point, a plurality of means for emulating or simulating program or microprogram storage, means for detecting a trace match word and storing trace data, and a plurality of functional microprogrammable very large scale integrated circuits (VLSI) emulators and a plurality of fixed instruction set microprocessor emulators;

a microprocessor programmed to selectively assign said plurality of facilities for operation in association with said clock control means such that the assigned facilities and clock control means form an execution site for the design, debugging and testing of a microprogrammable target machine;

a plurality of means for connecting said assigned facilities to said target machine; and wherein said VLSI emulator includes an emulator controller including a microprogrammable state controller connected to a means for multiplexing signals, a means for storing new operands connected to said multiplexer means, a data bus connected to said multiplexer means, a data/address bus which is connected to the microprogrammable state controller, a means for storing current state data connected to said data bus and to said data/address bus, a means for locating data in the current state data storage means which is connected to the microprogrammable state controller, and a means for controlling and varying a clock microcycle type connected to said microprogrammable state controller and to said data bus, and an emulator head including a VLSI device, a target machine input/output buffer connected to a target machine and the VLSI device, a means for controlling VLSI clock signals connected to the VLSI device and to the target machine input/output buffer, a state machine connected to said VLSI device and said target machine input/output buffer, and an emulator head input/output buffer connected to said VLSI device, said means for controlling VLSI clock signals, said state machine, and said data bus.

3. The device of claim 2, wherein, said microprogrammable state controller comprises an instruction register receiving data from a host processor bus and providing data to a 2910 sequencer for sequencing of instructions out of microprogram memory to a pipeline register, said pipeline register having a plurality of outputs including a combination data/address bus, a pointer control output, a multiplexer control output and a state controller data output, and a multiplexer for selecting between a test signal from said data bus and a start instruction execution signal from said data/address bus for input into said 2910 sequencer.

4. The device of claim 2 wherein, said VLSI device of said emulator head is an AMD 29116 device and said emulator head further includes means for externally simulating a latch internal to said 29116 device for receiving input signals from the target machine.

5. The device of claim 4 wherein,
said emulator head further includes a means for detecting a first part of an immediate instruction from the emulator controller and signalling said emulator controller.

6. The device of claim 2 wherein,
said emulator head includes an AMD 2910 device, a means for inputting data and instructions selectively from the target machine, or the emulator controller into the 2910 device and making data and instructions provided by the target machine available to the emulator controller, a means for controlling clock signals to the 2910 device, a means for providing the output of the 2910 device to the target machine and the emulator controller, a means for inputting control signals into the 2910 device, and means for connecting 2910 device output data and input data and instructions provided by the target machine to a trace device.

7. The device of claim 6 wherein,
said emulator controller further includes a means for determining the contents of an internal stack within said 2910 device.

8. The device of claim 6 wherein,
said emulator head further includes a means for determining the contents of an internal stack within said 2910 device.

9. A logial grouping of facilities within a development system, comprising:
a means for controlling clock signals;
a plurality of facilities including a means for controlling break points to halt the system at a predetermined match point, a plurality of means for emulating or simulating program or microprogram storage, means for detecting a trace match word and storing trace data, and a plurality of functional microprogrammable very large scale integrated circuits (VLSI) emulators and a plurality of fixed instruction set microprocessor emulators;
a microprocessor programmed to selectively assign said plurality of facilities for operation in association with said clock control means such that the assigned facilities and clock control means form an execution site for the design, debugging and testing of a microprogrammable target machine;
a plurality of means for connecting said assigned facilities to said target machine; and
wherein said means for controlling break points includes a first register for storing user defined values corresponding to a point at which the user desires to halt the operation of all or part of the target machine, a second register for storing data samples from the target machine and a means for comparing the values of the first register with the data of the second register and generating an output signal when said data an said values match.

10. A logical grouping of facilities within a development system, comprising,
a means for controlling clock signals;
a plurality of facilities including a means for conrolling break points to halt the system at a predetermined match point, a plurality of means for emulating or simulating program or microprogram storage, means for detecting a trace match word and storing trace data, and a plurality of functional microprogrammable very large scale integrated circuits (VLSI) emulators and a plurality of fixed instruction set microprocessor emulators;
a microprocessor programmed to selectively assign said plurality of facilities for operation in association with said clock control means such that the assigned facilities and clock control means for an execution site for the design, debugging and testing of a microprogrammable target machine;
a plurality of means for connecting said assigned facilities to said target machine; and
wherein said means for detecting a trace match word and storing trace data includes a register for storing user defined values corresponding to a point at which the user desires to store data from the target machine, a means for comparing the user defined values with the data sample from the target machine and generating an output signal when said data and values match such that said data sample is stored in a means for storing data from which said data sample may be retrieved by the user.

* * * * *